(12) United States Patent
Changsrivong et al.

(10) Patent No.: US 8,845,251 B2
(45) Date of Patent: Sep. 30, 2014

(54) FASTENING DEVICES, ASSEMBLIES AND RELATED METHODS

(75) Inventors: Derek Changsrivong, Foothill Ranch, CA (US); Hugh Cook, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 218 days.

(21) Appl. No.: 13/454,401

(22) Filed: Apr. 24, 2012

(65) Prior Publication Data

US 2013/0004258 A1 Jan. 3, 2013

Related U.S. Application Data

(60) Provisional application No. 61/546,332, filed on Oct. 12, 2011, provisional application No. 61/478,829, filed on Apr. 25, 2011.

(51) Int. Cl.
*F16B 39/282* (2006.01)

(52) U.S. Cl.
USPC .......................................... 411/143; 411/132

(58) Field of Classification Search
USPC ............... 411/145, 7, 12, 303, 289, 299, 275, 411/218, 230, 251, 207, 981, 958, 929.1, 411/352, 313, 314, 331, 543, 132, 133, 144
IPC ........................................................ F16B 39/24
See application file for complete search history.

(56) References Cited

U.S. PATENT DOCUMENTS

| | | | | |
|---|---|---|---|---|
| 1,450,065 A | * | 3/1923 | Dodds | 411/299 |
| 2,881,819 A | * | 4/1959 | Devaux | 411/299 |
| 3,288,191 A | * | 11/1966 | Thorborg | 411/149 |
| 3,316,952 A | * | 5/1967 | Hollinger | 411/301 |
| 4,408,927 A | * | 10/1983 | Fraiberg | 403/320 |
| 6,036,236 A | * | 3/2000 | Bensel | 285/89 |
| 6,227,782 B1 | * | 5/2001 | Bowling et al. | 411/114 |

* cited by examiner

*Primary Examiner* — Gary Estremsky
(74) *Attorney, Agent, or Firm* — Klein, O'Neill & Singh, LLP

(57) ABSTRACT

Fastening devices are disclosed herein with variations on how said devices resist loosening or un-fastening from a structure or structures. In some examples, the fastening devices accomplish the removal resistant condition by using a spring component engaging ridged surfaces. The spring component generally consists of a spring ring conveniently coiled to a canting position. One exemplary design is characterized by incorporating a screw element with its head underside surface being ridged and a lock element with a ridged topside surface and engaging the two ridges surfaces. Another exemplary design is characterized by a screw element having a head outer sidewall being ridged for cooperating with a bore having a ridged inner sidewall. The bore can be part of a first body or structure or a lock element.

22 Claims, 18 Drawing Sheets

Figure 1A
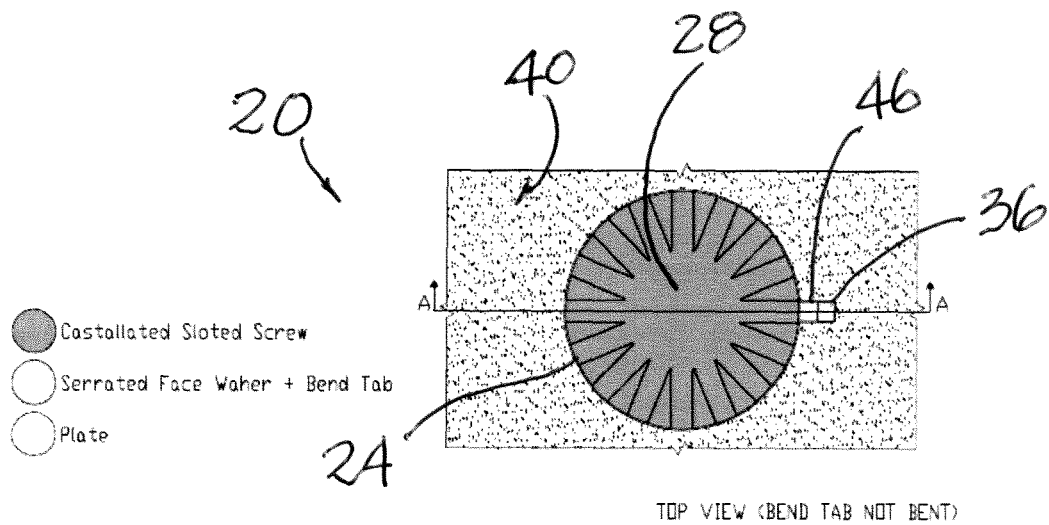
TOP VIEW (BEND TAB NOT BENT)
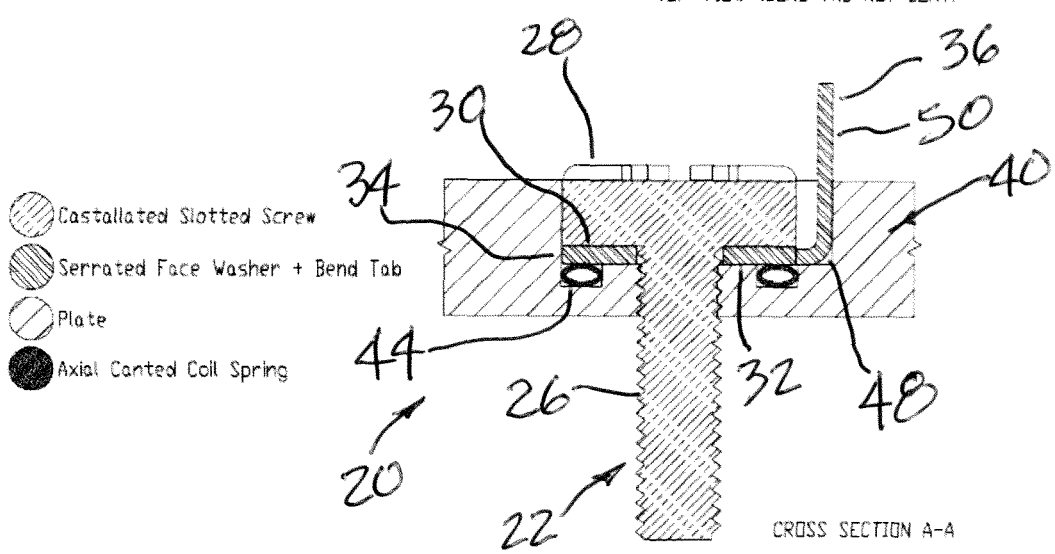
CROSS SECTION A-A
Figure 1B Figure 2A
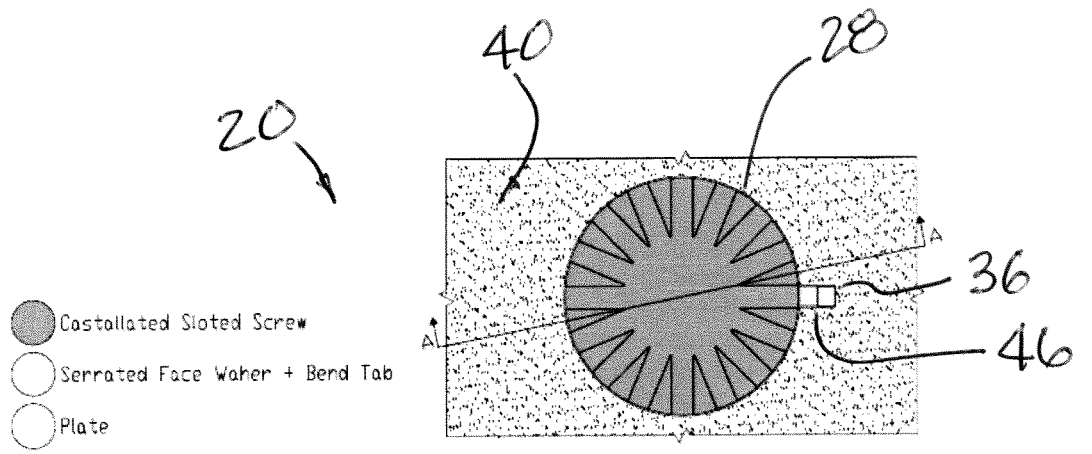
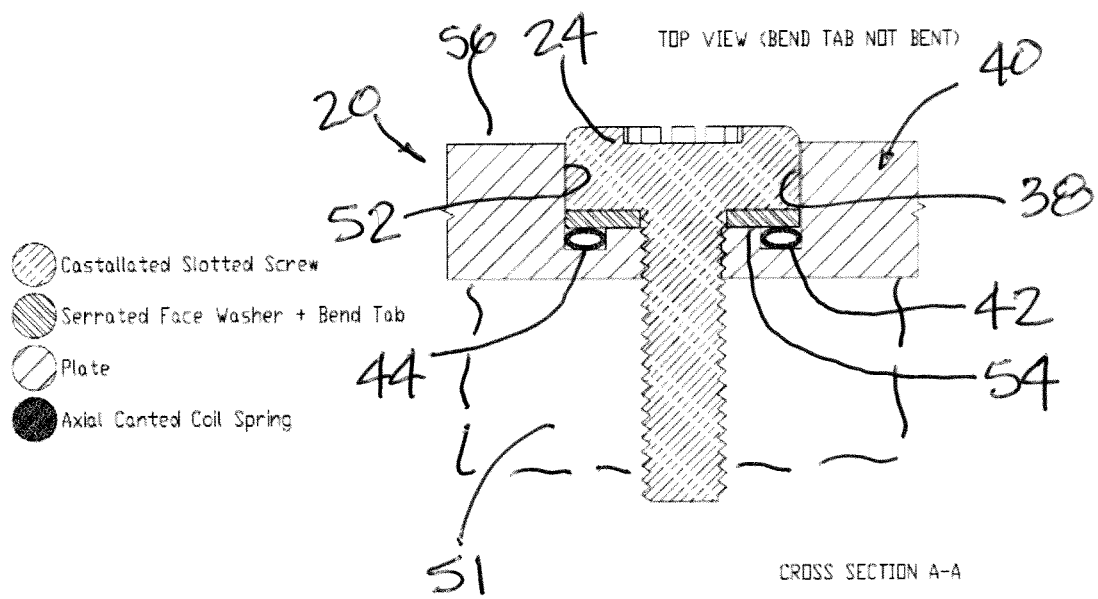
Figure 2B

Figure 3A
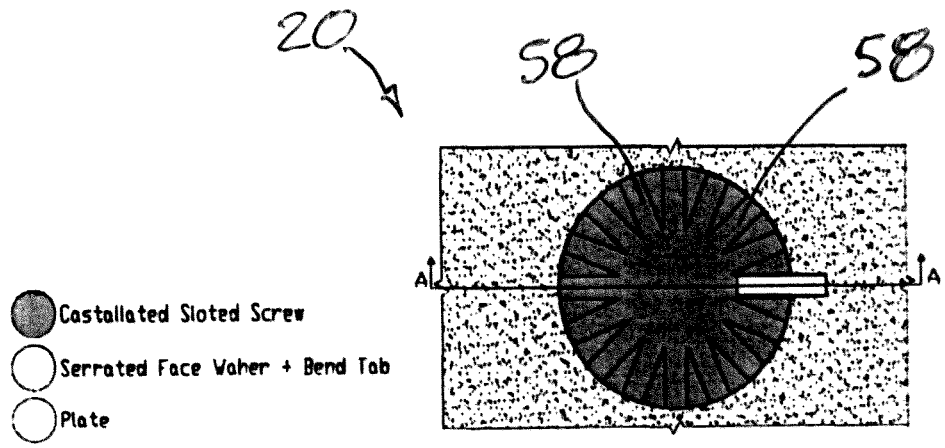
TOP VIEW (BEND TAB BENT)
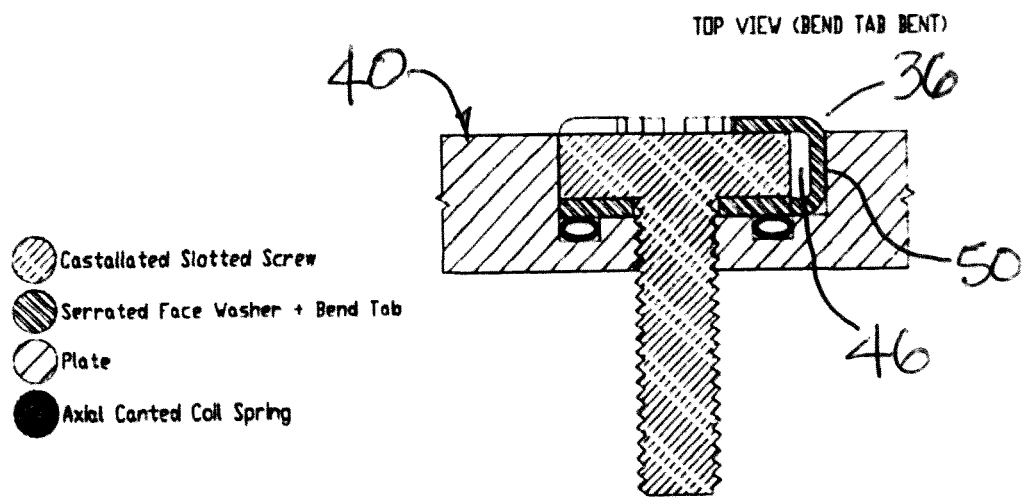
CROSS SECTION A-A
Figure 3B Figure 4A
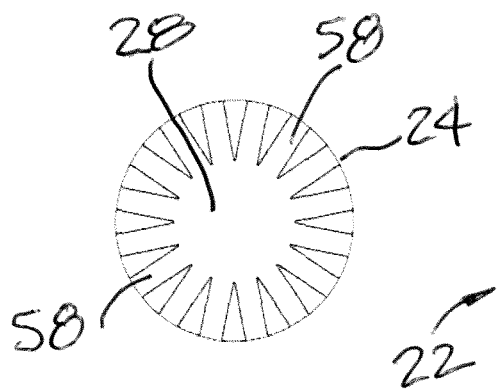
Figure 4B
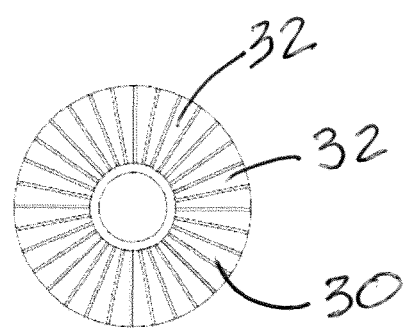
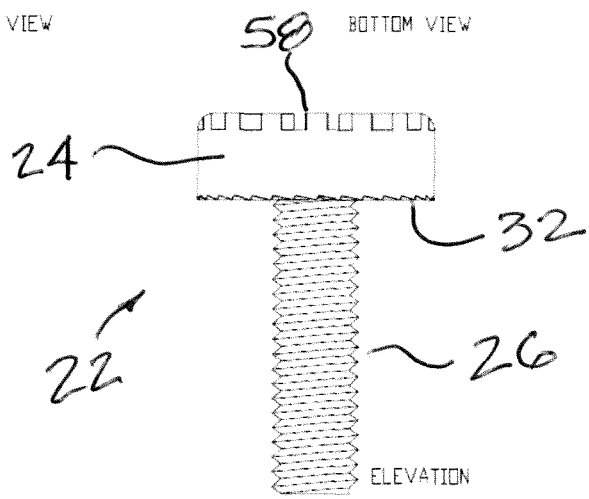
Figure 4C Figure 5A
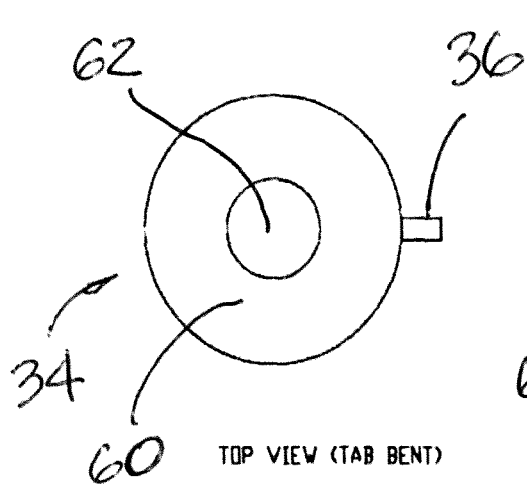
TOP VIEW (TAB BENT)
Figure 5B
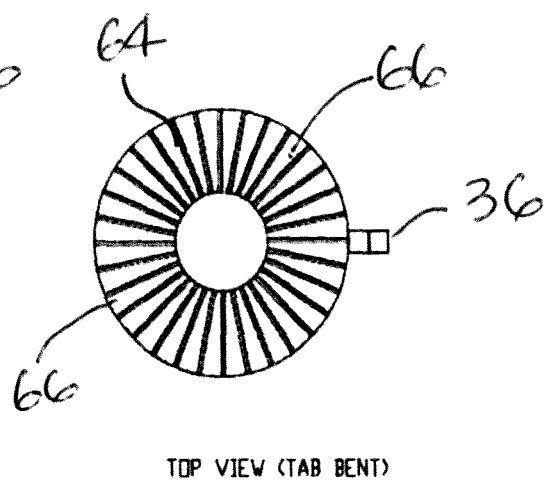
TOP VIEW (TAB BENT)
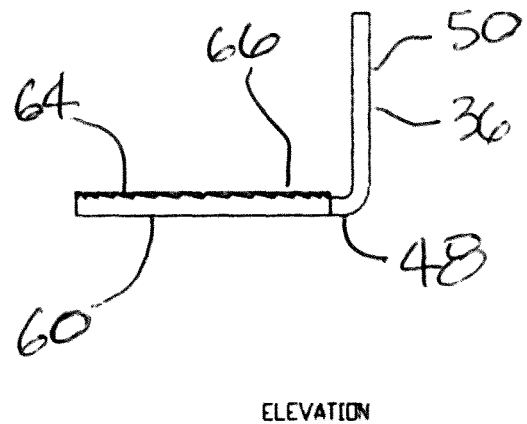
ELEVATION
Figure 5C Figure 6A
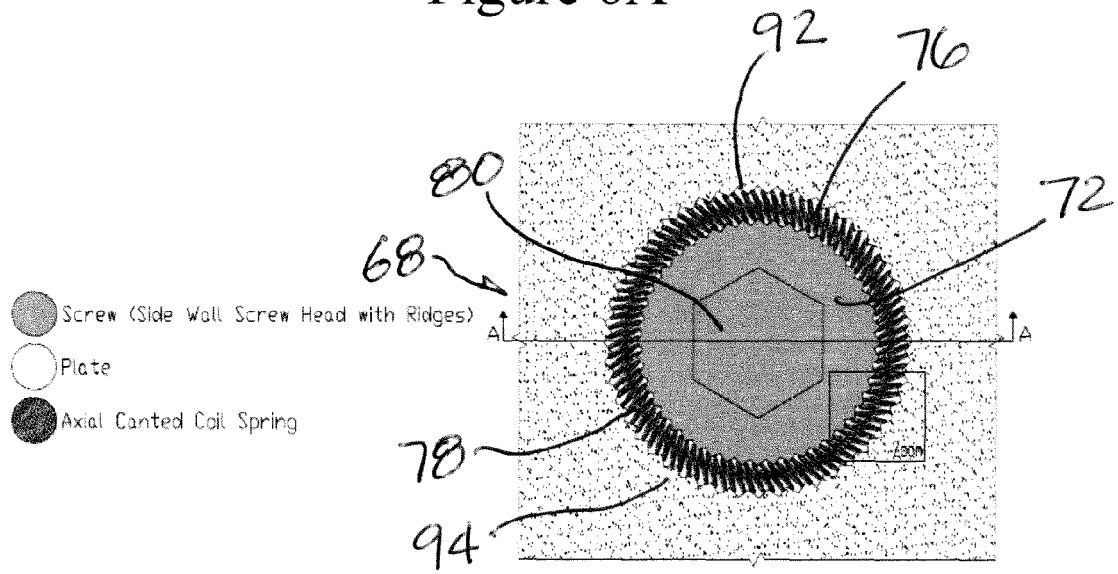
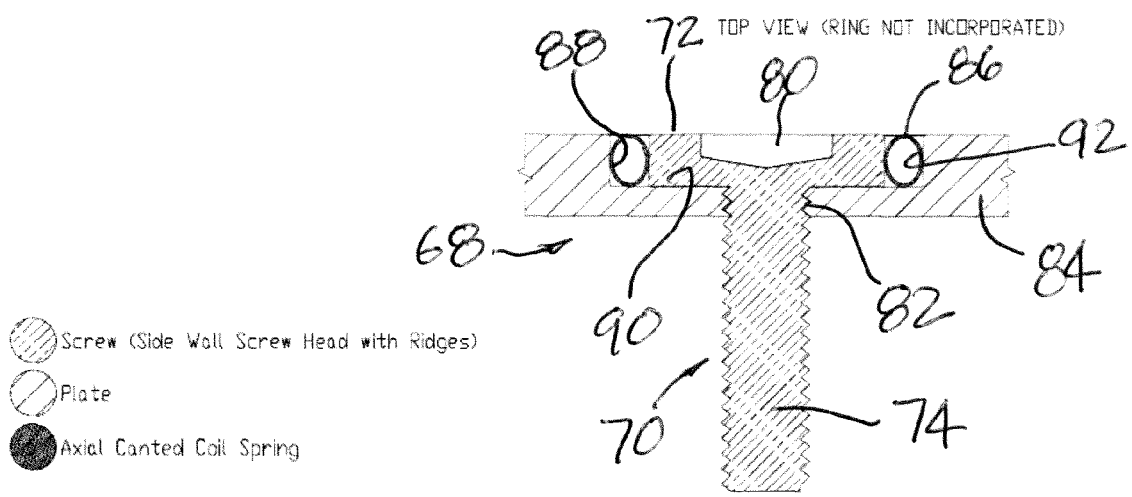
CROSS SECTION A-A
Figure 6B

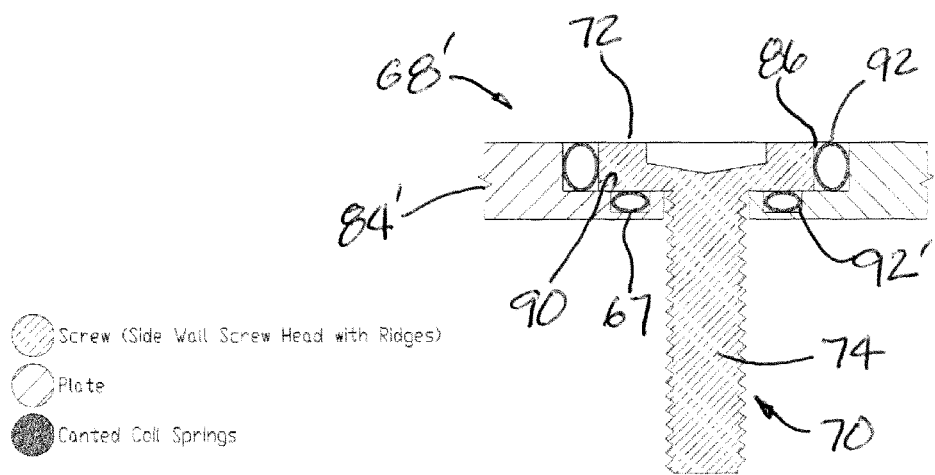
Figure 6B1

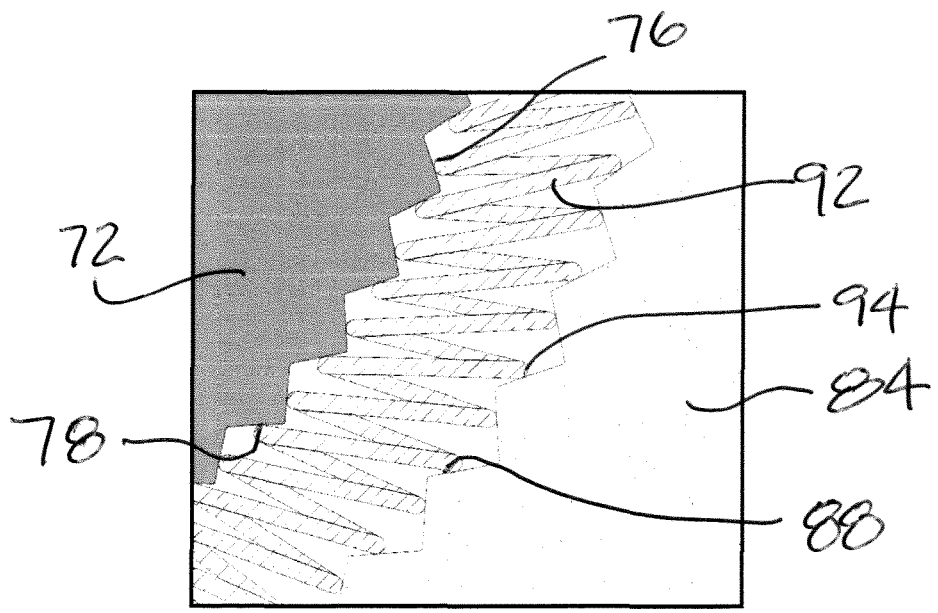
Figure 6C
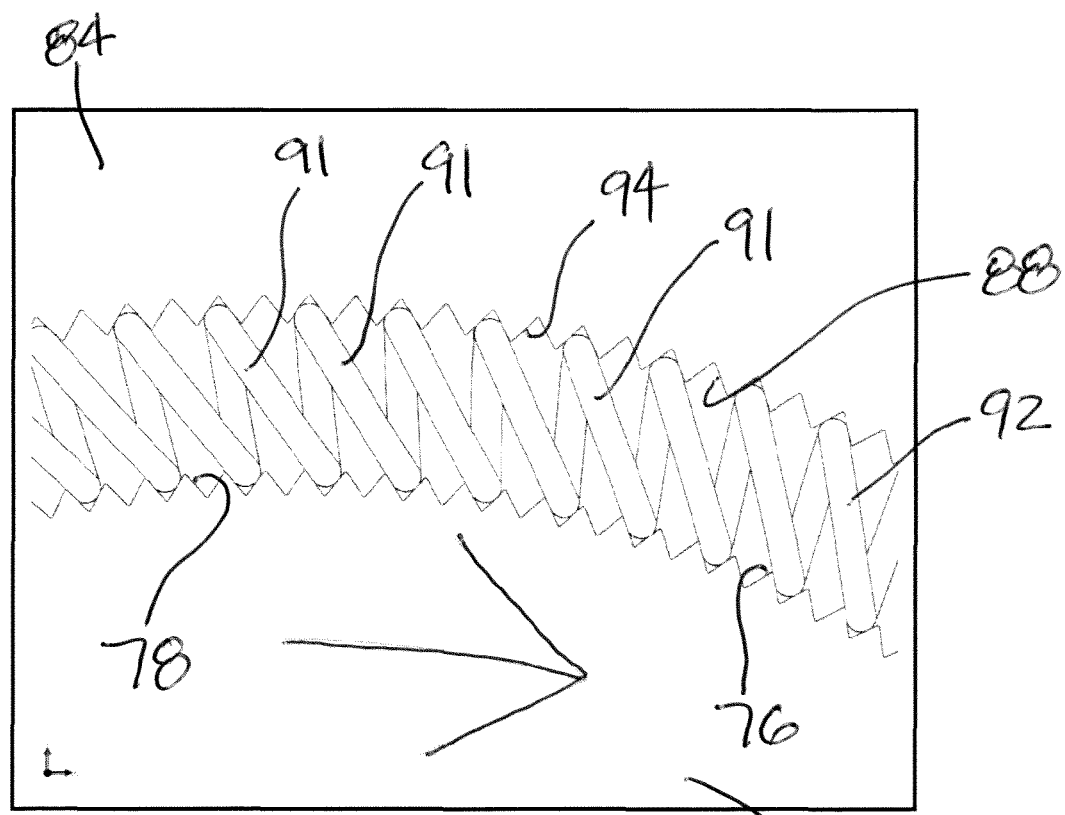
Figure 6C1

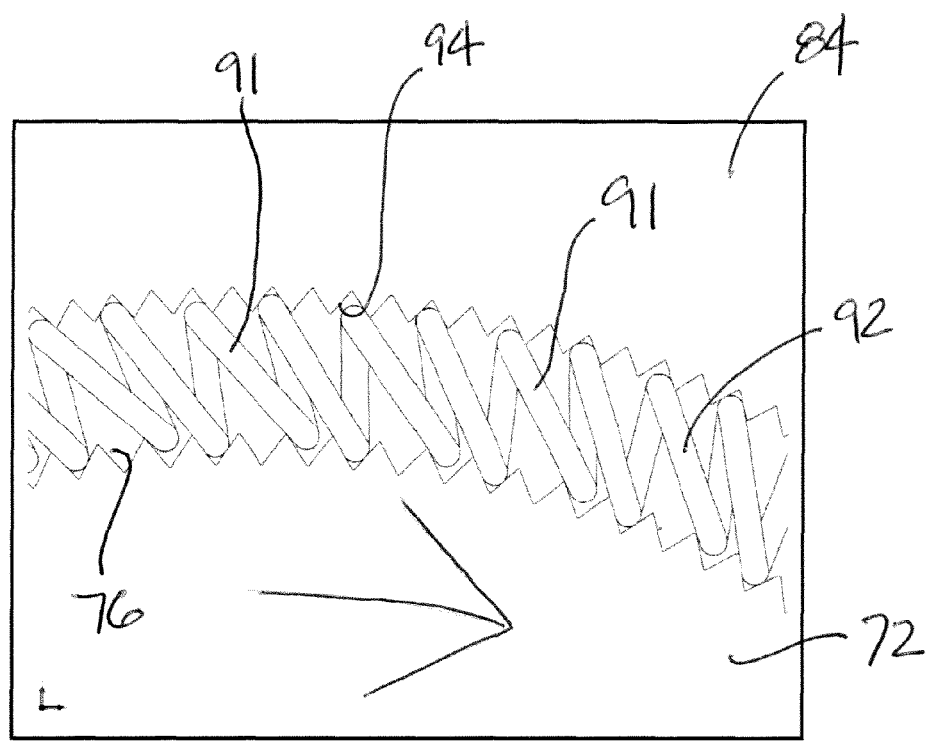
Figure 6C2

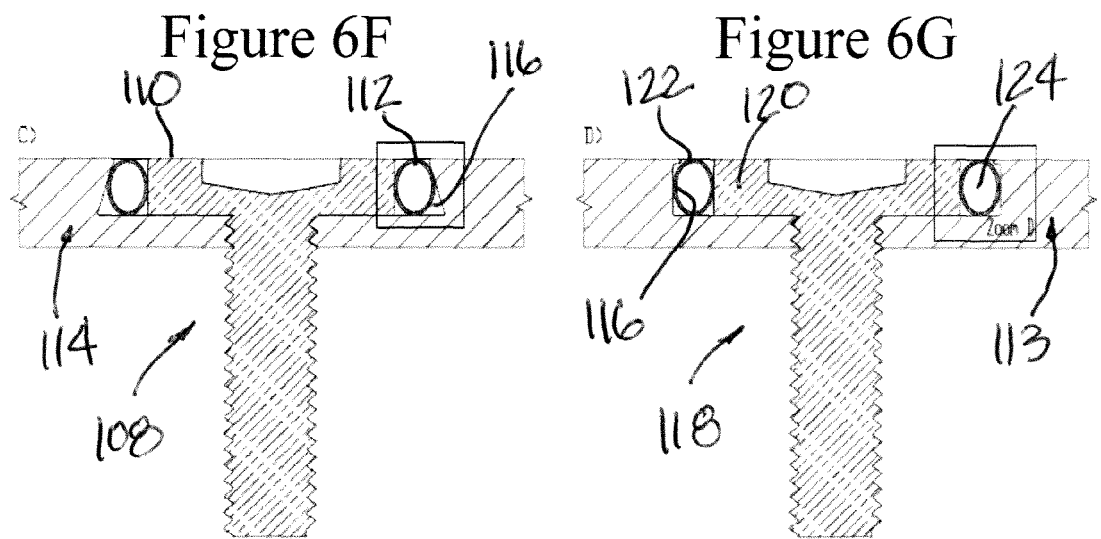
Figure 6F  Figure 6G
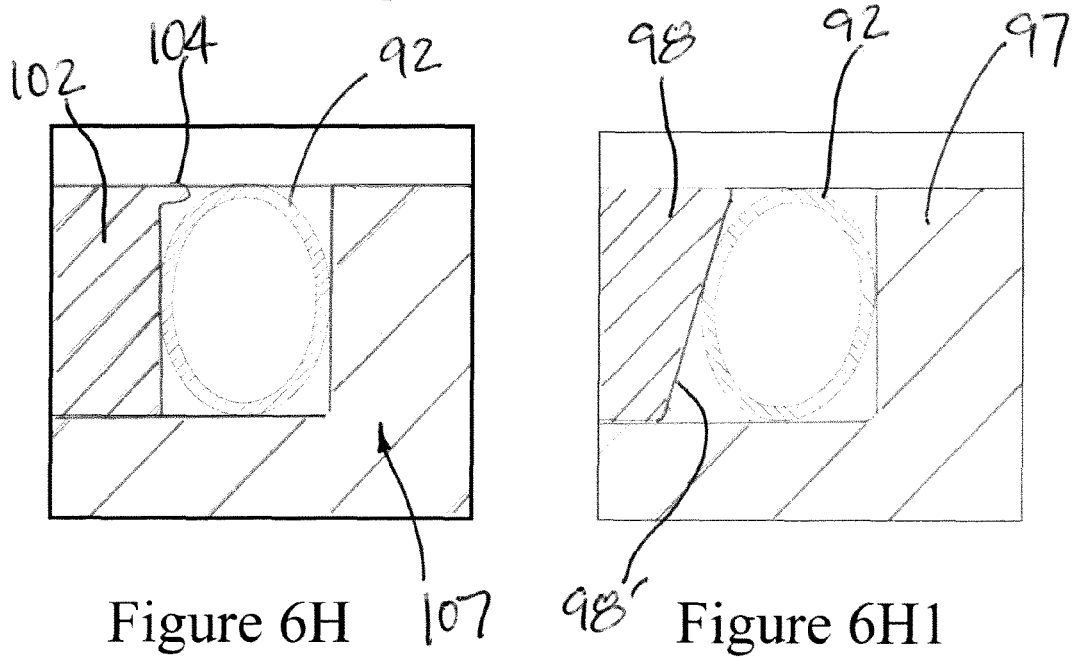
Figure 6H  Figure 6H1

Figure 6I1

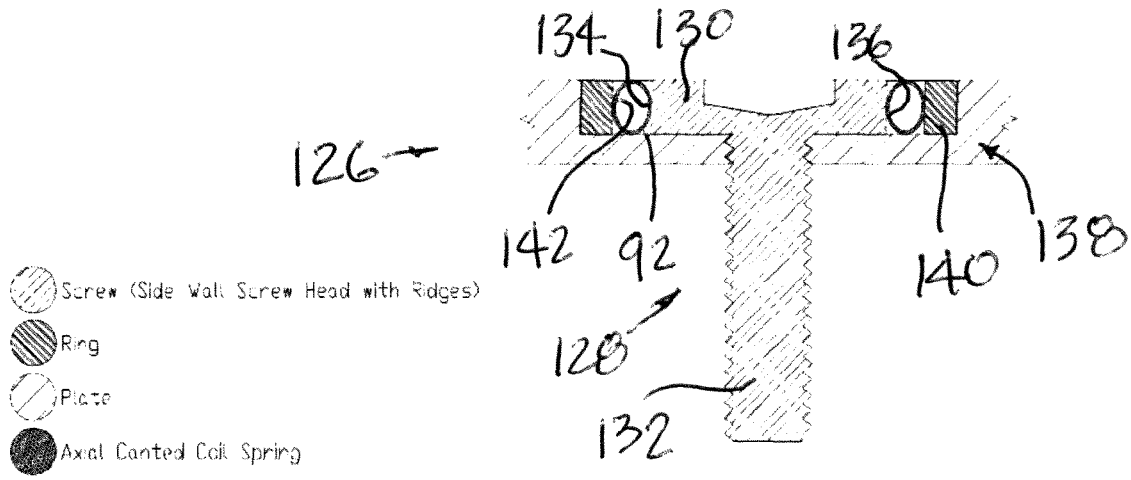
Figure 7B
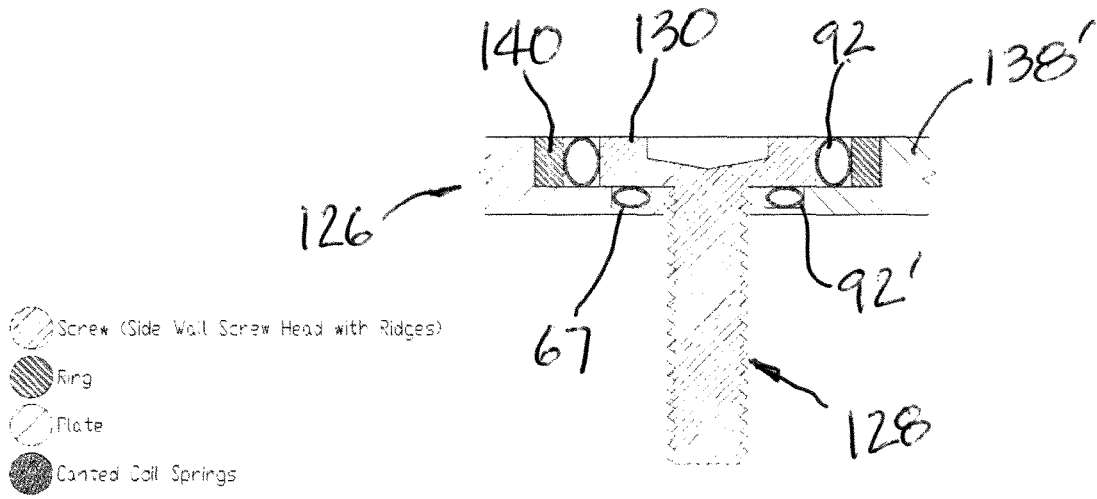
Figure 7B1

TOP VIEW (RING INCORPORATED)

CROSS SECTION A-A

Figure 7F              Figure 7G
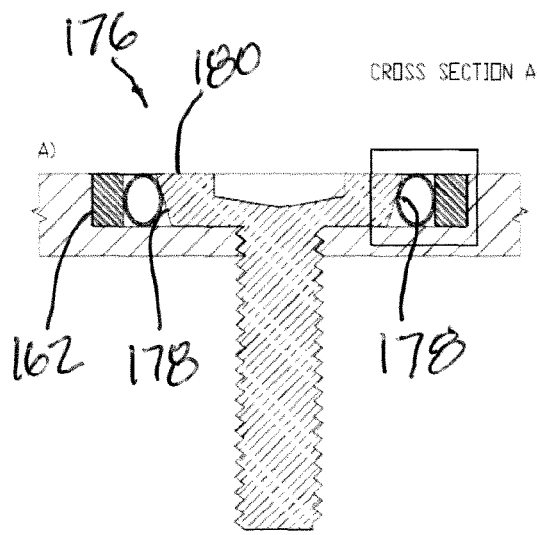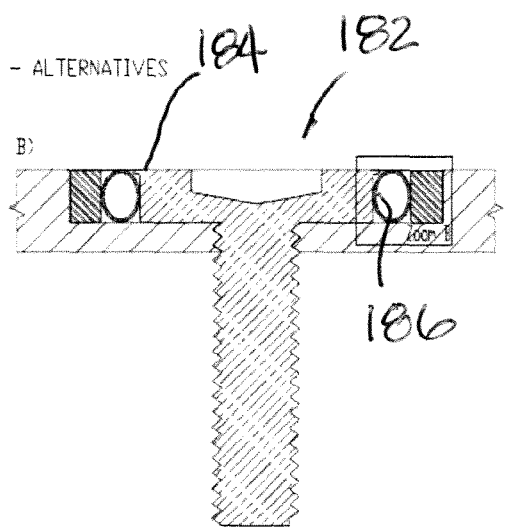
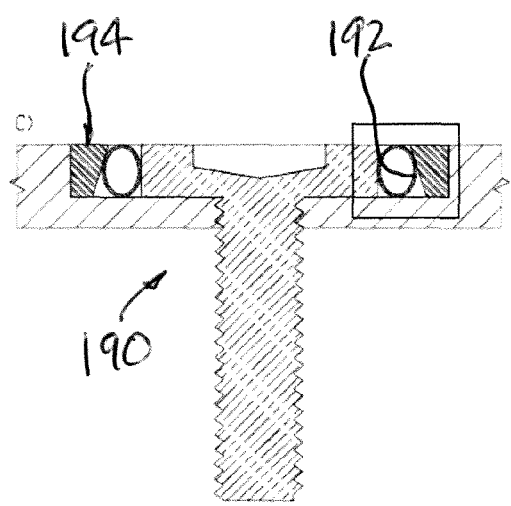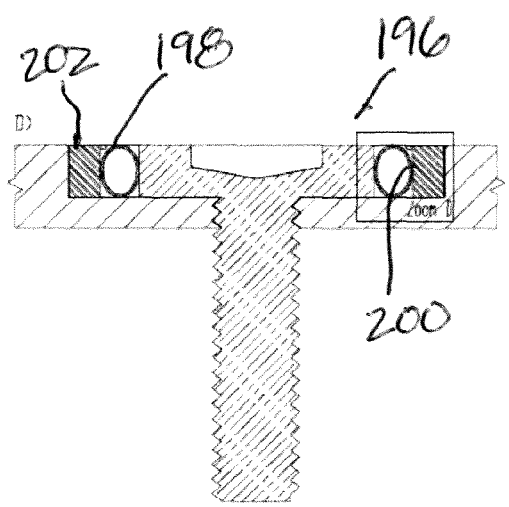
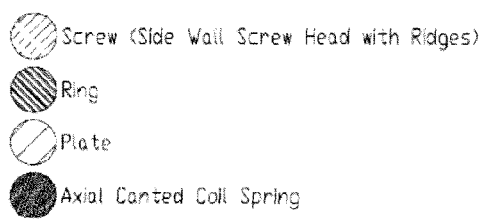
Figure 7H              Figure 7I

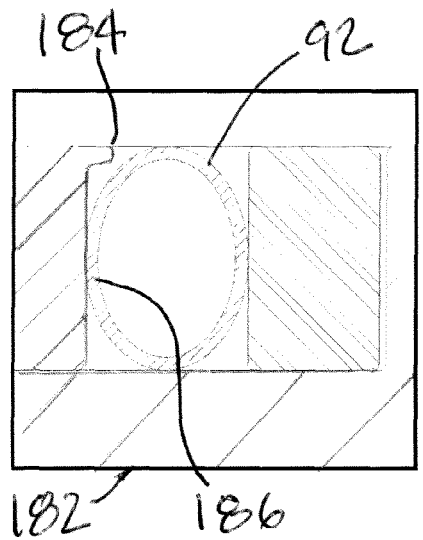
Figure 7J
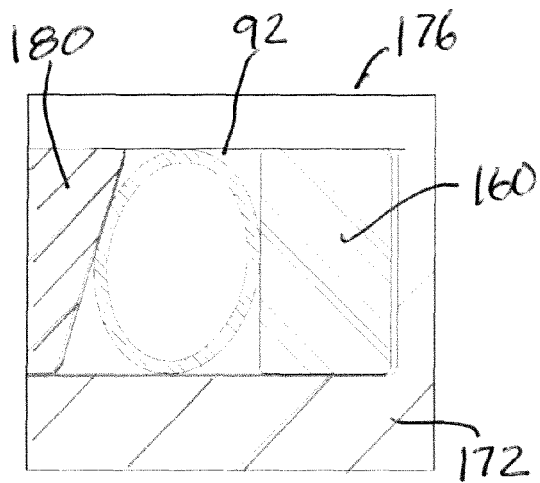
Figure 7J1
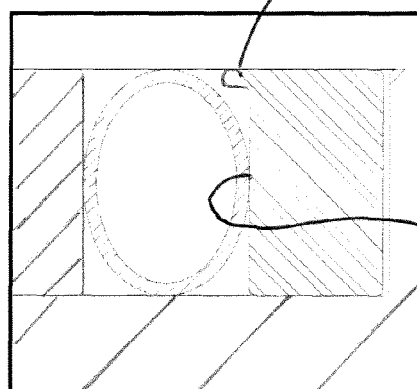
Figure 7K
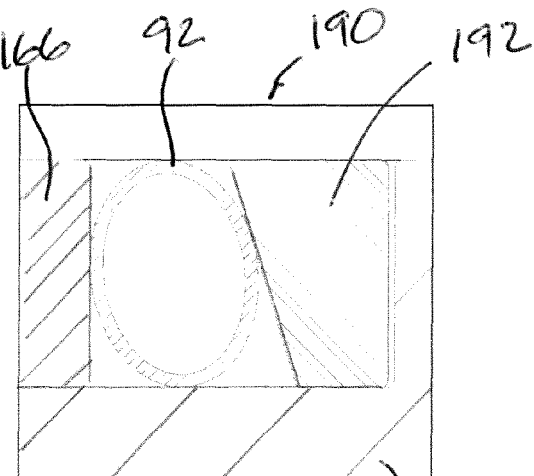
Figure 7K1

FASTENING DEVICES, ASSEMBLIES AND RELATED METHODS

CROSS-REFERENCE TO RELATED APPLICATIONS

This is a regular utility application of provisional application Ser. No. 61/546,332, filed Oct. 12, 2011, and of provisional application Ser. No. 61/478,829, filed Apr. 25, 2011. The contents of both provisional applications are expressly incorporated herein by reference.

FIELD OF ART

The present devices, assemblies and methods relate to threaded fastening devices and more specifically those that include removal resistant features.

BACKGROUND

There are many applications where removal resistant fastening devices are desired, such as in the medical field, aerospace, automotive, and electrical, which includes electrical distribution, consumer electronics, etc. Threaded fasteners can become loose or undone due to vibration, thermo-cycling, or by physical contact, in advertent or otherwise. Another exemplary application is in spinal plates, where screws are used to fix the plate to the vertebrates, i.e., to fix a first body to a second body. In due course, the bone screws may loosen over time due to vibration and/or spine movement.

SUMMARY

The present devices and assemblies include loosen resistant screws, which utilize a canted coil spring and related methods.

Multiple removal resistant screw fastening devices are disclosed herein. The devices use a spring component engaging ridged surfaces to resist loosening. An exemplary design comprises a screw, a first body to be fastened to a second body, a lock element, such as a washer, prevents the screw from rotation with respect to the first body, and a spring element positioned in contact with the lock washer in the first body. In one example the screw head underside and the lock element topside are ridged surfaces that engage one another. The spring adds a biasing force to further ensure engagement between the ridged surfaces. This ridged engagement prevents the screw from removal. Another exemplary design includes a screw, a first body fastened to a second body, and a spring element. The first body bore diameter is larger than the screw head diameter. The first body bore inner sidewall and the screw head outer sidewall are ridged surfaces that engage the spring element, which is placed within the space available between the bore sidewall and the screw head. In an alternative embodiment, a ring element is disposed between the spring and the bore sidewall and the spring element. The ring element comprises a ridged surface for engaging the spring.

In exemplary embodiments, a removal resistant fastening device for securing a first body to a second body is provided. The device can comprise a screw element, a lock element having a topside surface and an underside surface, and a spring element. The screw element comprises a head and a shank. The screw element and the lock element both comprise ridged surfaces that, at least in part, engage. The ridged surface of the screw element is located on an underside surface of the head and the ridged surface of the lock element is located on the topside surface. The spring element is configured to bias the lock element towards the head.

The removal resistant fastening device as noted wherein the lock element has at least one protruding member that fits within a gap in a surface of the first body.

The removal resistant fastening device as noted wherein the head of the screw element comprises a topside surface that is slotted and said lock element has a bendable lateral tab that fits within a gap in the first body and in a slot of the topside surface of the head.

In another exemplary embodiment, a removal resistant fastening assembly is provided. The assembly comprises a screw element, a spring element, a first body, and a second body. The screw element comprises a head that is larger in diameter than a shank. The head comprises an outer sidewall and the first body having a bore inner sidewall having radially-arranged ridged surfaces. The spring element is positioned in a space defined between the head and the bore inner sidewall. The screw element is rotatable in a first direction when turning at a first force and rotatable in a second direction which is opposite the first direction when turning at a second force, which is larger than the first force.

The removal resistant fastening assembly as noted, wherein the outer sidewall of the head is tapered relative to an axis of the shank.

The removal resistant fastening assembly as noted wherein the outer sidewall of the head has a lip that extends radially away from the shank.

The removal resistant fastening assembly as noted wherein the first bore of the first body is tapered relative to an axis of the shank.

The removal resistant fastening assembly as noted, wherein the bore of the first body has a lip that extends radially inwardly of a perimeter of the bore.

In a further example, a removal resistant fastening assembly is provided. The assembly comprising a screw element, a lock element, a spring element and a first body fastened to a second body. The screw element comprises a head that is larger in diameter than a shank. The lock element is placed about a bore of the first body and prevented from rotating relative to the first body by positioning a protruded member of the lock element into a gap in the first body. The head comprises an outer sidewall having a ridged surface and the lock element comprising an inner sidewall having a ridged surface; the two ridged surfaces engaging, at least in part, one another. The spring component is fitted in a space defined between the head and the lock element and allows the screw element to turn only in one direction when turning at a first force and in a second direction, which is opposite the first direction, when turning at a second force, which is greater than the first force.

The removal resistant fastening assembly as noted, wherein the outer sidewall of the head is tapered relative to an axis of the shank portion.

The removal resistant fastening assembly as noted, wherein the outer sidewall of the head has a lip.

The removal resistant fastening assembly as noted, wherein the inner sidewall of the lock element is tapered.

The removal resistant fastening assembly as noted wherein the inner sidewall of the lock element has a lip.

Features of the present description further include a removal resistant fastening device for securing a first body to a second body comprising: a screw element comprising a screw head having a screw head side wall and a shank; a canted coil spring comprising a plurality of coils; a housing comprising a bore having a side wall defining a first opening of a first diameter and a second opening of a second smaller diameter; the first opening having the screw head disposed therein and the second opening being a through hole and having the shank passing therethrough; wherein at least one of the screw head and the bore of the housing comprises surfaces having ridges; and wherein at least ten coils of the plurality of coils engage the ridges.

The removal resistant further comprising a lock element having a topside surface an underside surface, and a through bore: and wherein the lock element is biased by the canted coil spring.

The removal resistant fastening device, wherein the topside surface, the bottom side surface, part of a surface forming the through bore of the lock element, or all the topside surface, the bottom side surface; and the surface forming the through bore have ridges formed thereon.

The removal resistant fastening device, wherein the lock element further comprises a tab having a length that is longer than a width.

The removal resistant fastening device, wherein the screw head comprises a slot for receiving a tool to turn the screw head.

The removal resistant fastening device, wherein the screw head side wall or the side wall of the bore is tapered relative to an axis defined by the shank.

The removal resistant fastening device, wherein the screw head or the bore of the housing has a lip extending therefrom.

The removal resistant fastening device, wherein the canted coil spring is located between the screw head and a lock element.

Features of the present description further include a method for using a removal resistant fastening device for securing a first body to a second body. The method comprising: providing a screw element comprising a screw head having a screw head side wall and a shank; providing a canted coil spring comprising a plurality of coils; placing the screw element through a housing said housing comprising a bore having a side wall defining a first opening of a first diameter and a second opening of a second smaller diameter; the first opening having the screw head disposed therein and the second opening being a through hole and having the shank passing therethrough; wherein at least one of the screw head and the bore of the housing comprises surfaces having ridges; and causing at least ten coils of the plurality of coils to engage the ridges.

The method further comprising threading the shank into a threaded bore.

The method further comprising placing a lock element into the bore and causing the canted coil spring to bias the lock element.

The method further comprising removing the screw element from the housing using a removal force, and wherein the removal force is higher than a force to secure the screw element so that the screw head is within the bore of the housing.

The method further comprising the step of engaging the at least ten coils of the plurality of coils to a plurality of ridges located on the lock element.

The method further comprising the step of bending a tab formed on the lock element.

The method further comprising the step of providing a tapered surface on the screw head side wall or the side wall of the bore, the tapered surface being tapered relative to an axis defined by the shank.

BRIEF DESCRIPTION OF DRAWINGS

These and other features and advantages of the present device, system, and method will become appreciated as the same becomes better understood with reference to the specification claims and appended drawings wherein:

FIGS. 1A-1B show a top view and a cross section of a fastening device in its unlocked configuration.

FIGS. 2A-2B show top view and a cross section of a fastening device in its unlocked configuration.

FIGS. 3A-3B show a top view and a cross section of a fastening device in its locked configuration.

FIGS. 4A. 4B, and 4C show different views of a castellated slotted screw shown in FIGS. 1A-3B.

FIGS. 5A, 5B, and 5C show different views a serrated face washer shown in FIGS. 1A-3B.

FIGS. 6A-6B show a top view and a cross section of another fastening device.

FIG. 6B1 shows an alternative embodiment of the fastening device of FIGS. 6A-6B.

FIG. 6C is an enlarged view of an area or section of the fastening device illustrated in FIG. 6A.

FIG. 6C1 is an alternative embodiment of FIGS. 6A. 6B, and 6C.

FIG. 6C2 is an alternative embodiment of FIGS. 6A, 6B, and 6C.

FIGS. 6D-6G show four cross sections corresponding to four different alternative configurations of the fastener device depicted in FIG. 6B.

FIG. 6H is an enlarged view of an area or section of one of the cross sections illustrated in FIG. 6E.

FIG. 6H1 is an enlarged view of an area or section of one of the cross sections illustrated in FIG. 6D.

6I1 is an enlarged view of an area or section of one of the cross sections illustrated in FIG. 6F.

Figure 7A:
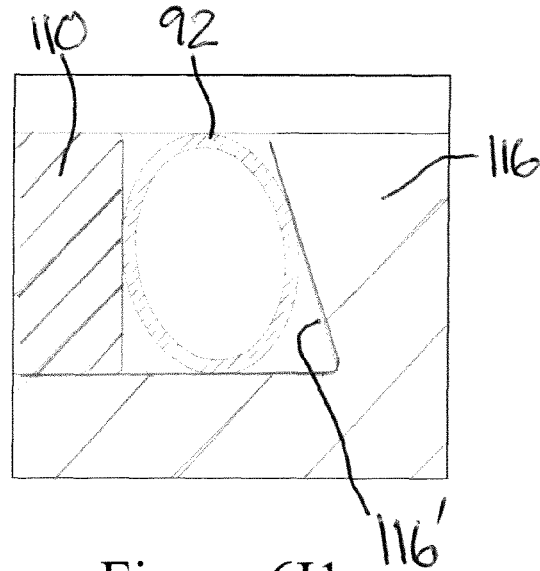
Figure 7A:
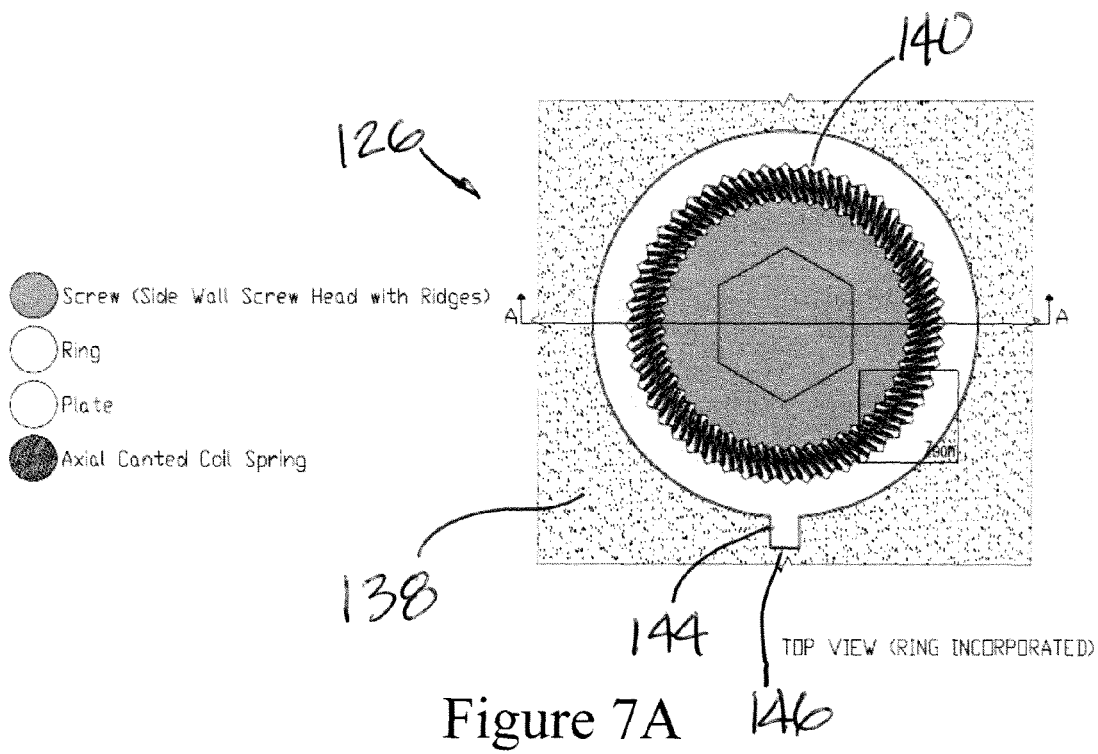

FIGS. 7A-7B show a top view and a cross section of another fastening device provided in accordance with aspects of the present device assembly and method.

FIG. 7B1 is an alternative embodiment of the device of FIGS. 7A-7B.

Figure 7C:
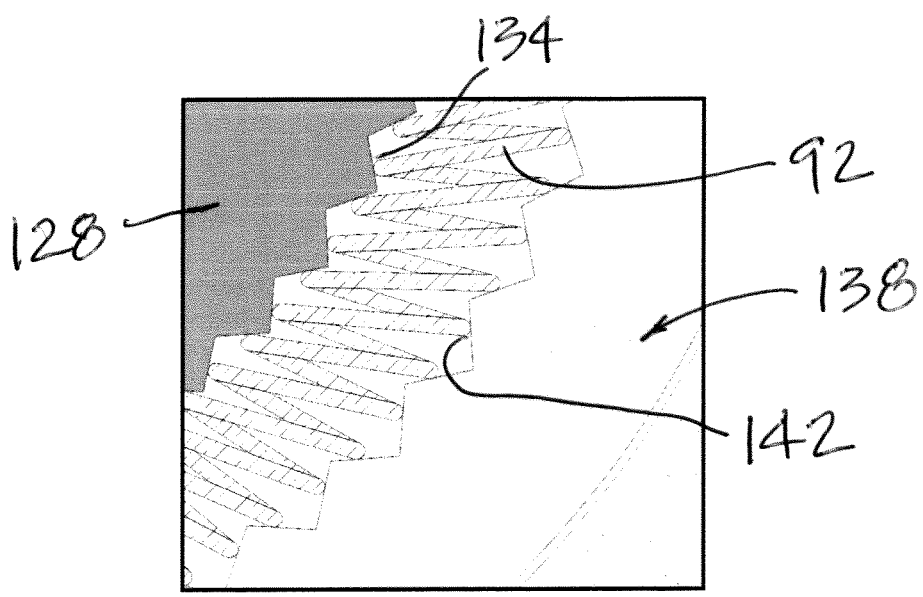

FIG. 7C is an enlarged view of an area or section of one of the cross sections illustrated in FIG. 7A.

Figures 7D, 7E:
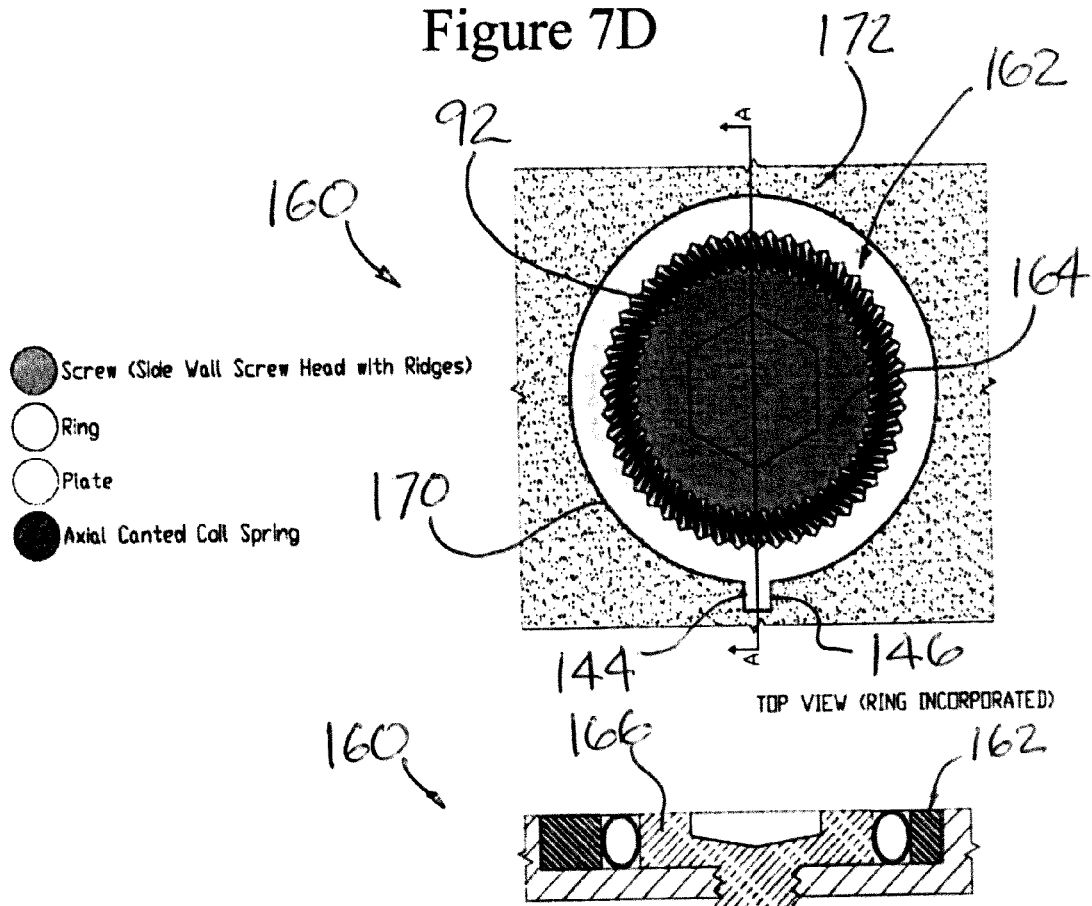

FIGS. 7D-7E show a top view and a cross section of another fastening device provided in accordance with aspects of the present device assembly and method.

FIGS. 7F-7I show four cross sections corresponding to four different alternative configurations of the fastener device depicted in FIGS. 7D-7E.

FIG. 7J is an enlarged view of an area or section of one of the cross sections illustrated in FIG. 7G.

7J1 is an enlarged view of an area or section of one of the cross sections illustrated in FIG. 7F.

FIG. 7K is an enlarged view of an area or section of one of the cross sections illustrated in FIG. 7I.

FIG. 7K1 is an enlarged view of an area or section of one of the cross sections illustrated in FIG. 7H.

Figures 8A, 8B:
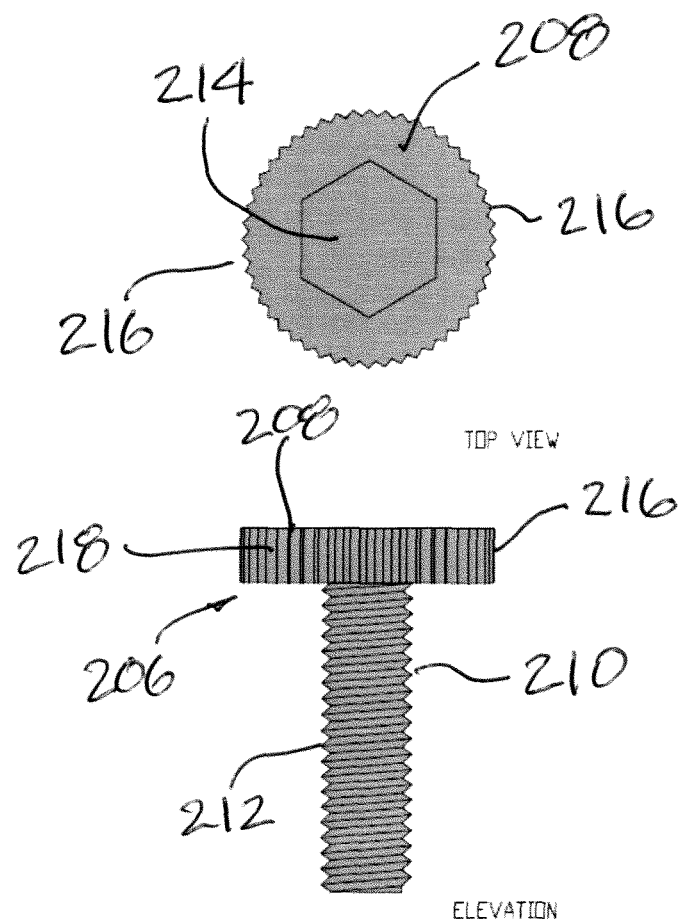

FIGS. 8A-8B show a top view and an elevation of a screw shown in FIGS. 7F-7I.

DETAILED DESCRIPTION

The detailed description set forth below in connection with the appended drawings is intended as a description of the presently preferred embodiments of fastening connectors or fastener devices provided in accordance with aspects of the present device, system and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

With reference now to FIG. 1A and FIG. 1B, a top view and a cross section of a fastening device 20 in an unlocked configuration are shown. The fastening device 20 comprises a slotted screw 22 comprising a head 24 and a threaded shaft or shank 26. The upper surface 28 of the head 24 is slotted, such as with a single channel or cross-channels or with any number of grooves or channels for mating with a corresponding turning device or instrument for rotating the screw. The slots may also be used to engage with a tab, as further discussed below. In the embodiment shown, the underside or bottom surface 30 of the head 24 incorporates raised serrated ridges 32 such as bumps, grooves, ridges, channels, or castellated surfaces. The slots on the upper surface 28 may have similar serrated ridges 32 as the underside surface 30. In another embodiment, the slots on the upper surface and the serrated grooves on the underside surface differ in configuration. As used herein, the terms "top", "under", "first", or "second" seekto merely define different parts or sections of a structure and are subject to different viewing perspectives. Thus, unless indicated otherwise, these terms are not structurally limiting.

The connector 20 further includes a lock element 34 which may be a washer a ring, or a flange, comprising a tab 36, which may be unitarily formed with the washer or separately formed and subsequently attached to the lock element. The lock element has a bore for receiving the shank. In one example, the washer 34 incorporates a matching serrated face as the serrated face 32 of the underside surface of the head 24. When the washer 34 is placed at the bottom of the bore 38 of the housing 40 so that its serrated ridges mate with the serrated ridges 32 of the screw 22 and pressure or load is applied across the two surfaces, the washer and the head cannot rotate relative to one another. As shown, the housing bore 38 has a first opening for receiving the screw head and a second through opening for allowing the shaft or shank 26 to pass therethrough. In some examples, the housing 40 may embody a plate, a flange a bracket, or other structures, which may generically be referred to herein as a first body, to be secured by the fastener device of the present device, system, and method to another body. i.e., a second body. For example, the second body may be a pipe, an equipment, a plate, an engine, a bone, a desk, a base, a door, or any component that the screw 22 may or can be secured to or against. In one example a spring groove 42 is incorporated in the bore 38 of the housing 40. The spring groove 42 is sized to receive a canted coil spring 44 and allows a portion of each coil of the canted coil spring to extend beyond the groove to exert spring pressure against the washer 34. The spring 44 is preferably an axial canted coil spring, as understood by a person of ordinary skill in the art. In other embodiments, the spring is a radial canted coil spring with the spring major axis rotated to be non-parallel to the shank 26, i.e., at an angle. Thus, in addition to compression force caused by the shaft engaging the housing and exerting pressure between the head and the washer, the spring further biases the washer towards the head to ensure engagement between the mating serrated surfaces. The fastener device can be said to be spring loaded.

In one embodiment, the housing 40 is provided with a guide slot, channel, or groove 46 (FIG. 1A), generically a gap, for receiving the tab 36 on the washer 34. The guide slot 46 confines the tab 36 within the width of the slot to limit rotation of the tab 36 and therefore rotation of the washer 34. As shown, the tab 36 has a first tab section 48 formed at an angle to a second tab section 50. The second section 50 may be formed by bending the tab from the first section. The combination tab and washer may be formed by punching or machining from a metallic sheet or by other known fabrication techniques. Following installation, the extended section of the second tab section 50 may be bent over to engage one of the grooves or channels on the upper surface 28 of the head, as further discussed below.

FIGS. 2A and 2B show the same connector 20 as the connector of FIGS. 1A and 1B but with the cross-sectional view from a different perspective, as shown by line A-A in FIG. 2A. As shown, the bore 38 has a diameter that is slightly larger than the diameter of the head 24. In another embodiment, the bore or the head may incorporate a slot or groove for receiving an O-ring (not shown) to seal portions of the connector 20 below the O-ring.

As understood, aspects of the present connector device 20 comprises a housing comprising a bore 38 having a bore side surface 52 and a bore bottom surface 54 having a groove 42 formed therein containing a canted coil spring 44. A washer 34 having an upper serrated surface is placed in the bore and in contact with a head 24 of a screw 22 having a bottom serrated surface. More generically, an aspect of the present connector device comprises a canted coil spring that preloads a washer against a bottom surface of a screw head. The washer and the head may be prevented from relative rotation by incorporating matching serrated surfaces on the washer and the head. In a further aspect of the present device system and method, a tab is incorporated on the washer and held stationary from angular rotation relative to the shank by placing the tab in a slot formed in the housing. In another example, the washer is prevented from angular rotation relative to the bore.

Refer again to FIGS. 1B and 2B, the head 24 projects above the upper surface 56 of the housing 40. In another example the head 24 is even or level with the upper surface 56. In still yet another example the head 24 is recessed within the bore 38 and is located below the upper surface.

FIGS. 3A and 3B show a top view and a cross sectional side view of the fastening device 20 of FIGS. 1A-2B in its locked configuration. The device 20 may be locked by bending the tab 36 so that a portion of the second tab section 50 is folded and engages one of the slots 58 on the upper surface of the head. The engagement between the tab 36 and the head prevents rotation of the washer relative to the screw. Furthermore, by positioning in the guide slot 46 of the housing 40 the tab 36 is prevented from rotating relative to the housing.

FIGS. 4A. 4B, and 4C show a top view, a bottom view and an elevation view of the screw 22 of the fastening device 20 depicted in FIGS. 1A to 3B. The head 24 of the disclosed screw includes a castellated slotted topside 28 and serrated ridges 32 in its underside 30. One of the multiple slots 58 on the topside is configured to receive a bent portion of the tab 36 of the fastening device 30 when such device is in its locked configuration. The number of slots 58 and serrated ridges 32 may be selected to facilitate easy and simple engagement along a wide angular position of the head.

FIGS. 5A, 5B, and 5C show a top view, a bottom view, and an elevation view of the washer 34 provided in accordance with the present device, system, and method. The washer 34 has an attached tab 36, which has a first tab section 48 and a second tab section 50 formed at an angle to the first tab section. The washer 34 has an underside surface 60 an upper surface 64, and a bore 62 extending therebetween. In one example the underside surface 60 is generally flat or smooth, although grooves or other surface features may be incorporated. The upper surface 64 comprises a plurality of serrated ridges 66 that match the underside profile of the screw head 24 of the fastening device 20. The second tab section 50 is shown unbent. The serrated ridges 66 of the washer 34 and the serrated ridges 32 of the screw 22 are configured to mate or mesh, similar to gear surfaces.

FIG. 6A shows a top view of a fastening device 68 provided in accordance with another aspect of the present device, system, and method. FIG. 6B shows a cross section side view of the device 68 taken along line A-A of FIG. 6A. The fastening device 68 comprises a screw 70 having a head 72 and a threaded shaft or shank 74 and a plurality of ridges 76 formed along the outer sidewall 78 of the head 72. The head 72 incorporates a hex slot 80 for use with a matching rotating instrument to rotate the screw. However, other shaped slots may be incorporated without deviating from the scope of the present device, system, and method. The screw 70 projects through a bore 82 of a housing 84, which has an upper bore section 86 comprising a sidewall 88 defining a first opening for receiving a screw head and a bottom wall 90. The bottom wall 90 further comprises a second opening, which has a through hole for allowing the shank 74 to pass therethrough. As shown the upper bore section 86 is substantially wider than the screw head diameter for receiving a canted coil spring 92 therebetween. In one example, the sidewall surface 88 comprises ridges 94 formed on its sidewall surfaces for engaging the plurality of coils on the spring 92. When mounted as shown in FIGS. 6A and 6B, the canted coil spring 92 simultaneously engages the ridges 76 on the head 72 of the screw 70 and the ridges 94 of the sidewall surface 88 of the upper bore section 86. As the housing 84 is fixed from rotation, the engagement between the spring and the bore and the engagement between the spring and the screw head fix the screw 70 from rotating relative to the bore. The engagement produces a removal resistant fastening device. The spring also exerts a constant load against the screw head and is understood to eliminate screw vibration and play within the locking mechanism. Thus, an aspect of the present device, system, and method is understood to include a connector device comprising a screw comprising a head and a shank, a head side wall comprising a plurality of ridges sized and dimensioned to engage a plurality of coils of a canted coil spring. In one example, the spring is a radial canted coil spring. However, the space between the head 72 and the upper bore section 86 which defines a spring groove, may be angled to accept an axial canted coil spring. The present device, system, and method further include a housing having a bore and a sidewall surface of the bore comprising a plurality of ridges, and wherein the plurality of coils engage the plurality of ridges on the sidewall of the bore and the ridges on the head 72.

FIG. 6B1 shows a cross section side view of an alternative fastener device 68', which is an alternative embodiment of the device 68 of FIGS. 6A and 6B. In the present embodiment the upper bore section 86 of the housing 84' is modified to include a groove 67 formed on or in the bottom wall 90 of the housing 84', which presents a modified configuration from the housing of FIG. 6B. In one embodiment, the groove 67 is square and comprises two generally parallel sidewalls and a bottom wall that is orthogonal to at least one of the two sidewalls. In another embodiment, the bottom wall is tapered relative to the at least one of the two sidewalls. A canted coil spring 92', such as an axial canted coil spring, is located in the groove 67 and is biased against the bottom wall of the groove 67 and the bottom surface of the head 72. The added spring 92' therefore provides additional removal resistance to limit or restrict the screw 70 from backing out of the housing 84'. The two springs 92, 92' may be referred to as a first spring and a second spring.

FIG. 6C is an expanded view of a section or area of the fastening device 68 illustrated in FIG. 6A. As shown, part of the canted coil spring 92 is positioned between the housing bore section 86 and the screw head 72. The coils of the canted coil spring fit or engage with the ridges 94 of the inner sidewall 88 of the housing bore section as well as those of the outer sidewall 78 of the screw head 72.

FIG. 6C1 is an alternative configuration of the ridges 94 of the housing 84 and the ridges 76 of the screw head 72 of FIG. 6C. Among other things, a greater number of ridges are incorporated on the housing and the screw head for example a greater density of ridges per unit space. The greater number of ridges 76, 94 allow more of the individual coils 91 of the canted coil spring 92 to engage the individual ridges 76, 94. In one example, more than 75% of the coils, such as 80% or 85% of the coils, engage the individual ridges. The screw head is locked in this configuration and the backlash (the amount of allowable back rotation between the current state and the next "click" or locked state) is minimized.

FIG. 6C2 is an alternative configuration of the embodiment of FIG. 6C1. In the present embodiment, the ridges 94 of the housing 84, the ridges 76 of the screw head 72, the coil spacing of the spring 92 or all three are modified so that the some of the individual coils do not engage the individual ridges 76, 94 of the housing 84 and the screw head 72. In one embodiment, approximately half of the ridges 94 of the housing 84 are not engaged by any of the individual coils 91 of the spring 92. This figure shows some coils between two ridges and some coils near the ridge peaks. This configuration further reduces backlash since there will always be some coils that are biasing against back rotation and the amount of rotation required to get to the next locked state is reduced.

Figures 6D, 6E:
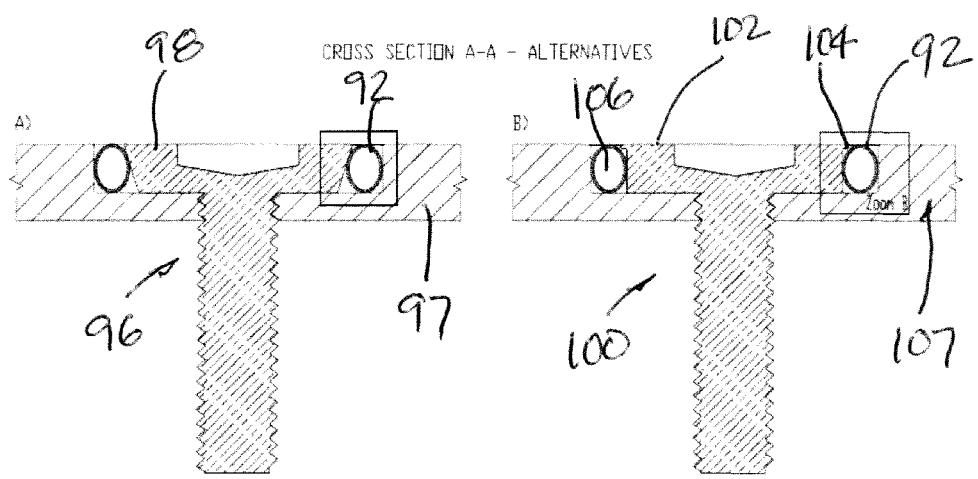

FIGS. 6D-6G show four cross sections of four alternative configurations of the fastener device 68 depicted in FIGS. 6A-6C. With specific reference to FIG. 6D, the fastener device 96 is shown with a screw head 98 having a ridged outer sidewall 98', which is tapered inwardly in the direction of the shaft, having a spring 92 biased thereto and against a side wall of the housing 97. An alternative configuration is shown in FIG. 6E and includes a fastener device 100 with a screw head 102 having a lip 104 at the top of the ridged tapered outer sidewall of the screw head. The lip 104 further ensures retention of the spring 92 within the spring groove 106 of the housing 107. Another alternative configuration shown in FIG. 6F and it includes a fastener device 108 with a screw head 110 located inside a bore 112 of a housing 114 having ridged inner sidewall 116 with a taper. In the FIG. 6F embodiment, the sidewall of the screw head is generally square, i.e., non-tapered. Alternative configuration shown in FIG. 6G includes a fastener device 118 with a screw head 120, similar to the screw head 110 of FIG. 6F, having a lip 122 at the top of the ridged inner sidewall 116 of the bore section 124 of the housing 113.

Thus, as disclosed, aspects of the present device system, and method include a fastener device comprising a screw having a head and a shaft, and wherein the head comprises an exterior sidewall comprising a plurality of ridges and wherein the exterior sidewall is either tapered or non-tapered. In a specific example, a lip is incorporated at the tapered sidewall, adjacent the top surface of the head. In another example, the fastener device is positioned inside a bore of a housing and wherein the bore is tapered. In one example, the bore of the housing comprises a lip at the tapered sidewall adjacent the top wall.

FIG. 6H shows an expanded view of an area or section of the alternative configuration shown in FIG. 6E, which shows the lip 104 at the top of the ridged outer sidewall of the screw head. The lip is configured to assist with retaining the canted coil spring in the cavity defined by the housing bore section and the screw head.

FIG. 6H1 shows an expanded view of an area or section of the alternative configuration shown in FIG. 6D, which shows a tapered sidewall 98' of the screws head 98, the spring 92, and the sidewall 97' of the housing 97.

Figure 6I:
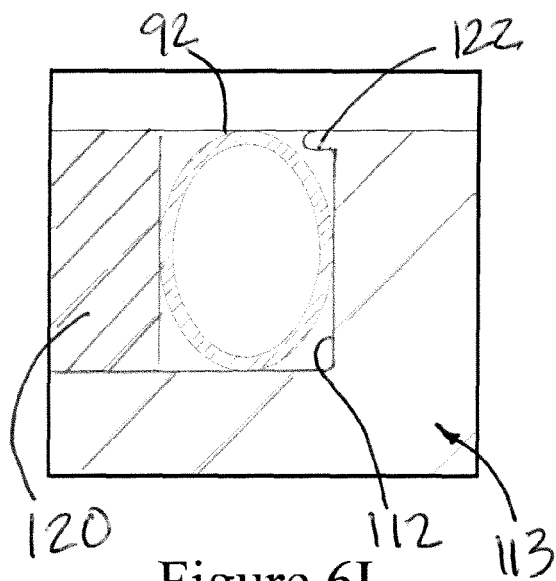
FIG. 6I is an enlarged view of an area or section of one of the cross sections illustrated in FIG. 6G.

FIG. 6I shows an expanded view of an area or section of the alternative configuration in FIG. 6G, which shows the lip 122 at the top of the ridged inner sidewall of the bore section 112 of the housing 113. The lip is configured to assist in retaining the canted coil spring in the cavity defined by the screw head and the said housing bore section.

FIG. 6I1 shows an expanded view of an area or section of the alternative configuration in FIG. 6F which shows a tapered sidewall 116' of the housing 114, the spring 92, and the sidewall of the screw head 110.

FIG. 7A and FIG. 7B show a top view and a cross section of a fastener device 126 comprising a screw 128 comprising a head 130 and a shank 132. The head 130 comprises a plurality of ridges 134 formed along the outer sidewall 136 thereof. The head 130 is located in a bore of a housing 138, which has a ring or lock element 140 received therein having an inner diameter wider than the screw head diameter. In one example, the ring 140 comprises ridges 142 formed along its inner sidewall for mating with the plurality of coils of the canted coil spring 92. The plurality of coils of the canted coil spring 92 also engages the ridges 134 of the outer sidewall 136 of the screw head 130. In one example, the ring 140 comprises a tab 144 positioned in a slot 146 (FIG. 7A) formed in the housing 148. The ring 140 prevents the screw 128 from rotating relative to the housing by means of the tab 144 engaging the slot 146 and by the engagement between the ridged surfaces 134. 142 and the spring 92.

FIG. 7B1 shows a cross section side view of an alternative fastener device 126, which is an alternative embodiment of the device 126 of FIGS. 7A and 7B. In the present embodiment, the upper bore section of the housing 138' is modified to include a groove 67 formed on or in the bottom wall of the housing 138', which presents a modified configuration from the housing 138 of FIG. 7B. In one embodiment, the groove 67 is square and comprises two generally parallel sidewalls and a bottom wall that is orthogonal to at least one of the two sidewalls. In another embodiment, the bottom wall is tapered relative to the at least one of the two sidewalls. A canted coil spring 92', such as an axial canted coil spring, is located in the groove 67 and is biased against the bottom wall of the groove 67 and the bottom surface of the head 130. The added spring 92' therefore provides additional removal resistance to limit or restrict the screw 128 from backing out of the housing 138' and away from the holding ring 140.

FIG. 7C shows an expanded view of an area or section of the fastening device 126 of FIGS. 7A-7B. As shown, part of the canted coil spring 92 is positioned between the ring 140 and the screw head 130. The plurality of coils of the canted coil spring engage the ridges of the inner sidewall of the ring as well as those of the outer sidewall of the screw head.

Thus, aspects of the present device, system and method include a fastener comprising a shank and a head located inside a bore of a housing and wherein a ring and a canted coil spring are located concentrically inside the bore with the head. Further features of the present device, system, and method are ridged surfaces formed on the ring and on the head for engaging a plurality of coils of the canted coil spring. The engagement between the spring and the ridged surfaces are configured to fix angular rotation, or at least resist angular rotation, of the fastener relative to the housing. To further facilitate fixing the angular rotation, or at least resist angular rotation, of the fastener, a tab is incorporated with the ring for engaging a slot formed in the housing. In yet another aspect of the present device, system and method, a stationary housing having a bore is provided, a screw comprising a head and a shank positioned in the bore, and wherein the screw is fixed from angular rotation, or at least resist angular rotation, relative to the housing by a spring concentrically placed with the head. In a specific example, a ring is provided with the spring to fix the angular rotation of the screw relative to the housing. In certain embodiments the head and the ring both have ridges surfaces for engaging a plurality of coils on the spring. Another aspect of the present device, system, and method is a provision for forming the housing, the spring, the screw and, where incorporated, the ring from implantable grade materials for medical applications. Preferably, the implantable materials are metallic or metallic-based materials.

In addition to the present devices and assemblies are methods for forming the devices and assemblies and methods for using the devices and assemblies described elsewhere herein.

FIG. 7D shows a top view of an alternative fastener device 160 while FIG. 7E shows a cross sectional view of the device 160 taken along line A-A of FIG. 7D. The present device 160 is similar to the device of FIGS. 7A-7C with the following exceptions. The housing bore 170 of the housing 172 may be non-circular, for example oval, elliptical, square star-shaped or rectangular to name a few. The ring 162 may be similarly shaped exteriorly so that the ring cannot rotate inside the bore or relative to the housing. Optionally a tab 144 and a slot 146 may be incorporated with the ring and the housing, respectively, but not necessary to prevent relative rotation between the ring and the housing. The screw 164 is shown with a head 166 and a threaded shank 168. The interior bore of the ring and the screw head should both be circular or generally circular to enable rotation of the screw relative to the ring for installation.

FIGS. 7F-7I are alterative embodiments of the fastener device 126 of FIGS. 7A and 7B. The fastener device 176 depicted in FIG. 7F incorporates a ridged outer sidewall 178 on the screw head 180 that is also tapered. FIG. 7G shows a fastener device 182 that includes a lip 184 at the top of the ridged outer sidewall 186 of the screw head 188. The ridged outer sidewall 186 may be non-tapered or tapered. FIG. 7H shows a fastener device 190 that incorporates a ridged inner sidewall 192 on the ring 194 that is also tapered. FIG. 7I shows a fastener device that incorporates a lip 198 at the top of the ridged inner sidewall 200 of the ring 202, which may be tapered or non-tapered.

FIG. 7J shows an expanded view of an area or section of the fastener device 182 of FIG. 7G. The lip 184 at the top of the ridged outer sidewall 186 of the screw head is clearly shown. The lip 184 assists to retain the canted coil spring 92 in the cavity defined by the ring and the screw head.

FIG. 7J1 shows an expanded view of an area or section of the fastener device 176 of FIG. 7F. As clearly shown, the screw head 180 has a tapered side wall surface pushed against the spring 92, which is pushed against the ring 160. The tapered side wall surface of the screw head assists to retain the canted coil spring 92 in the cavity defined by the ring and the screw head.

FIG. 7K shows an expanded view of an area or section of the fastener device 196 of FIG. 7I. The lip 198 at the top of the ridged inner sidewall 200 of the ring is clearly shown. The lip 198 assists to retain the canted coil spring in the cavity defined by the screw head and the ring.

FIG. 7K1 shows an expanded view of an area or section of the fastener device 190 of FIG. 7H. As clearly shown, the ring 192 has a tapered side wall surface puhsed against the spring 92, which is pushed against the side of the screw head 166. The tapered side wall surface of the ring assists to retain the canted coil spring 92 in the cavity defined by the ring and the screw head.

FIG. 8A and FIG. 8B show a top view and an elevation view of a screw 206 usable with the fastening devices depicted in the various figures and described elsewhere herein. The screw comprises a head 208 and a shank 210 comprising exterior threads 212. The head 208 comprises a hex bore 214 for use with a matching turning tool and exterior ridges 216 formed along the outer sidewall 218 of the head 208. The ridges are configured to engage with a plurality of coils of a canted coil spring, as described elsewhere herein.

Although limited embodiments of the fastening assemblies and their components have been specifically described and illustrated herein, many modifications and variations will be apparent to those skilled in the art. For example, the various fastening assemblies may have different lengths, diameters, and made from different materials than described, etc. Furthermore, it is understood and contemplated that features specifically discussed for one fastener embodiment may be adopted for inclusion with another fastener embodiment, provided the functions are compatible. For example, while an irregular shaped housing bore may be discussed with reference to FIGS. 7D and 7E, it may be used in another embodiment shown, for example with FIG. 3B or 6E. Furthermore, it is understood that the threaded shanks described herein are to be threaded into another structure or body. For example, the housing 40 described with reference to FIG. 2B is understood to be fastened to a second body 51 (shown in phantom) by threading the shank 26 into that second body. Thus, the fastener assemblies described herein are understood to be usable to fasten a first housing or structure to a second housing or structure. Accordingly, it is to be understood that the fastener assemblies and their components constructed according to principles of the disclosed device, system, and method may be embodied other than as specifically described herein. The disclosure is also defined in the following claims.

What is claimed is:

1. A removal resistant fastening device for securing a first body to a second body comprising:
    a screw element comprising a screw head having a screw head side wall and a shank;
    a canted coil spring comprising a plurality of coils;
    a housing comprising a bore having a side wall defining a first opening of a first diameter and a second opening of a second smaller diameter; the first opening having the screw head disposed therein and the second opening being a through hole and having the shank passing therethrough;
    wherein at least one of the screw head and the bore of the housing comprises surfaces having ridges; and
    wherein at least ten coils of the plurality of coils engage the ridges.

2. The removal resistant fastening device of claim 1; further comprising a lock element having a topside surface, an underside surface, and a through bore; and wherein the lock element is biased by the canted coil spring.

3. The removal resistant fastening device of claim 2, wherein the topside surface, the bottom side surface, part of a surface forming the through bore of the lock element, or all the topside surface, the bottom side surface; and the surface forming the through bore have ridges formed thereon.

4. The removal resistant fastening device of claim 1, wherein the bore of the housing further comprises a groove having two side walls and a bottom wall and having a second canted coil spring disposed therein.

5. The removal resistant fastening device of claim 1, wherein the screw head comprises a slot for receiving a tool to turn the screw head.

6. The removal resistant fastening device of claim 1, wherein the screw head side wall or the side wall of the bore is tapered relative to an axis defined by the shank.

7. The removal resistant fastening device of claim 1, wherein the screw head or the bore of the housing has a lip extending therefrom.

8. The removal resistant fastening device of claim 1, wherein the canted coil spring is located between the screw head and a lock element.

9. A method for using a removal resistant fastening device for securing a first body to a second body comprising:
    providing a screw element comprising a screw head having a screw head side wall and a shank;
    providing a canted coil spring comprising a plurality of coils;
    placing the screw element through a housing, said housing comprising a bore having a side wall defining a first opening of a first diameter and a second opening of a second smaller diameter; the first opening having the screw head disposed therein and the second opening being a through hole and having the shank passing therethrough;
    wherein at least one of the screw head and the bore of the housing comprises surfaces having ridges; and
    causing at least ten coils of the plurality of coils to engage the ridges.

10. The method of claim 9, further comprising threading the shank into a threaded bore.

11. The method of claim 9, further comprising placing a lock element into the bore and causing the canted coil spring to bias the lock element.

12. The method of claim 9, further comprising the step of providing a groove in the bore of the housing and placing a second canted coil spring therein.

13. The method of claim 11, further comprising the step of engaging the at least ten coils of the plurality of coils to a plurality of ridges located on the lock element.

14. The method of claim 11, further comprising the step of bending a tab formed on the lock element.

15. The method of claim 11, further comprising the step of providing a tapered surface on the screw head side wall or the side wall of the bore, the tapered surface being tapered relative to an axis defined by the shank.

16. A removal resistant fastening assembly comprising:
    a screw element, a canted coil spring, a first body, and a second body;
    the screw element comprising a head that is larger in diameter than a shank; the head comprising an outer sidewall and the first body having a bore inner sidewall having radially-arranged ridged surfaces;
    the canted coil spring is positioned in a circumferential space defined between the head and the bore inner sidewall and in contact with the radially-arranged ridged surfaces;
    wherein the screw element is rotatable in a first direction when turning at a first force and rotatable in a second direction, which is opposite the first direction, when turning at a second force, which is larger than the first force.

17. The removal resistant fastening assembly according to claim 16, wherein the outer sidewall of the head is tapered relative to an axis of the shank.

18. The removal resistant fastening assembly according to claim 16, wherein the outer sidewall of the head has a lip that extends radially away from the shank.

19. The removal resistant fastening assembly according to claim 16, wherein the first bore of the first body is tapered relative to an axis of the shank.

20. The removal resistant fastening assembly according to claim 16, wherein the bore of the first body has a lip that extends radially inwardly of a perimeter of the bore.

21. The removal resistant fastening assembly according to claim 16, wherein more than 85% of all spring coils of the spring element each protrudes into a lower half region between two ridges in the head outer sidewall and the bore inner sidewall.

22. The removal resistant fastening assembly according to claim 16, wherein approximately half of all spring coils of the spring each protrudes into a lower half region between two ridges and half of all the spring coils of the spring do not protrude into the lower half region between two ridges in the head outer sidewall or the bore inner sidewall.

* * * * *

UNITED STATES PATENT AND TRADEMARK OFFICE
CERTIFICATE OF CORRECTION

PATENT NO. : 8,845,251 B2
APPLICATION NO. : 13/454401
DATED : September 30, 2014
INVENTOR(S) : Derek Changsrivong et al.

It is certified that error appears in the above-identified patent and that said Letters Patent is hereby corrected as shown below:

In the Specification

In column 1, line 16, delete "devices" and insert -- devices, --, therefor.

In column 1, line 45, delete "example" and insert -- example, --, therefor.

In column 2, line 6, delete "noted" and insert -- noted, --, therefor.

In column 2, line 20, delete "direction" and insert -- direction, --, therefor.

In column 2, line 21, delete "direction" and insert -- direction, --, therefor.

In column 2, line 26, delete "noted" and insert -- noted, --, therefor.

In column 2, line 29, delete "noted" and insert -- noted, --, therefor.

In column 2, line 59, delete "noted" and insert -- noted, --, therefor.

In column 3, line 8, delete "surface" and insert -- surface, --, therefor.

In column 3, line 35, delete "housing" and insert -- housing, --, therefor.

In column 3, line 59, delete "method" and insert -- method, --, therefor.

In column 4, line 1-2, delete "specification" and insert -- specification, --, therefor.

In column 4, line 9, delete "FIGS. 4A." and insert -- FIGS. 4A, --, therefor.

In column 4, line 19, delete "FIGS. 6A." and insert -- FIGS. 6A, --, therefor.

In column 4, line 36, delete "device assembly" and insert -- device, assembly, --, therefor.

In column 4, line 43, delete "device assembly" and insert -- device, assembly, --, therefor.

In column 4, line 64, delete "system" and insert -- system, --, therefor.

In column 5, line 19, delete "ridges 32" and insert -- ridges 32, --, therefor.

In column 5, line 25, delete "seekto" and insert -- seek to --, therefor.

In column 5, line 29, delete "element 34" and insert -- element 34, --, therefor.

In column 5, line 30, delete "washer" and insert -- washer, --, therefor.

In column 5, line 44, delete "flange" and insert -- flange, --, therefor.

Signed and Sealed this
Twenty-first Day of July, 2015

Michelle K. Lee
*Director of the United States Patent and Trademark Office*

CERTIFICATE OF CORRECTION (continued)
U.S. Pat. No. 8,845,251 B2

In column 5, line 50, delete "example" and insert -- example, --, therefor.

In column 6, line 31, delete "device system" and insert -- device, system, --, therefor.

In column 6, line 37, delete "example" and insert -- example, --, therefor.

In column 6, line 39, delete "example" and insert -- example, --, therefor.

In column 6, line 48, delete "housing 40" and insert -- housing 40, --, therefor.

In column 6, line 64, delete "section 50" and insert -- section 50, --, therefor.

In column 6, line 65, delete "surface 60" and insert -- surface 60, --, therefor.

In column 6, line 67, delete "example" and insert -- example, --, therefor.

In column 7, line 46, delete "section 86" and insert -- section 86, --, therefor.

In column 7, line 55, delete "embodiment" and insert -- embodiment, --, therefor.

In column 8, line 14, delete "head" and insert -- head, --, therefor.

In column 8, line 57, delete "device" and insert -- device, --, therefor.

In column 9, line 9, delete "screws" and insert -- screw --, therefor.

In column 9, line 18, delete "FIG. 6F" and insert -- FIG. 6F. --, therefor.

In column 9, line 61, delete "system" and insert -- system, --, therefor.

In column 10, line 14, delete "embodiments" and insert -- embodiments, --, therefor.

In column 10, line 18, delete "screw" and insert -- screw, --, therefor.

In column 10, line 30, delete "square star-shaped" and insert -- square, star-shaped, --, therefor.

In column 10, line 31, delete "rectangular" and insert -- rectangular, --, therefor.